March 19, 1929.  H. HEHMSOTH  1,706,229
MEASURING AND DRAWING INSTRUMENT FOR MAKING
PERSPECTIVE PICTURES FROM NATURE
Filed Nov. 1, 1926

Inventor:

Patented Mar. 19, 1929.

1,706,229

UNITED STATES PATENT OFFICE.

HEINRICH HEHMSOTH, OF BREMEN, GERMANY, ASSIGNOR TO HANS MEISSNER, OF BREMEN, GERMANY.

MEASURING AND DRAWING INSTRUMENT FOR MAKING PERSPECTIVE PICTURES FROM NATURE.

Application filed November 1, 1926, Serial No. 145,602, and in Germany October 31, 1925.

Measuring and drawing instruments for making perspective pictures, and which consist of a measure with stationary or movable protractor and pivotable arms, are known in many forms of construction; with these measuring and drawing instruments only one angle can be measured and, owing to the movable arrangement of the protractor, it is impossible to mount several arms on the instrument for measuring at the same time several angles, and these instruments can further not be used as a drawing instrument on the drawing board. In other instruments it is impossible to read downwardly directed angles situated underneath the horizontal measure.

All these inconveniences are avoided according to the invention by providing on the instrument, which consists of the rule-shaped horizontal measure and of the semi-circular protractor fixed on said measure, several pivotable arms of the same width as the ruler two of said arms being extended beyond the pivot point. One of these two extended arms is pointed at its rear end, said pointed end moving over the scale of the protractor. The extended arm has an aperture at a certain distance from the pivot point. The other extended arm is movably mounted underneath the protractor and it has near its end which projects over the protractor a marking line and on the other side of the pivot point a mark. The third pivotable arm serves to indicate the perpendicular line to the horizontally adjusted ruler.

Two embodiments of the instrument, improved according to the invention, are illustrated in the accompanying drawing, in which.

The protractor $a$ is made in one piece with the horizontal measure $b$. Of the three arms $d$, $e$, $f$ pivotably mounted on the pivot pin $c$ the arms $d$ and $e$ are extended beyond the pivot pin $c$, the third arm $f$ reaching only to this pivot pin. The extension of the arm $d$ has a pointed end $k$, which moves as pointer over the scale of the protractor. The arm $d$ has an aperture $i$ at a short distance from and at the other side of the pivot pin and serving to view the direction of the arm of the angle which has to be measured. The arm $e$ is mounted under the protractor and the end of its extension beyond the pivot pin $c$ projects over the circumference of the protractor and has on the front end a marking line $l$ which moves along the scale on the protractor. On the arm $e$ a mark $m$ is arranged.

Figure 1:
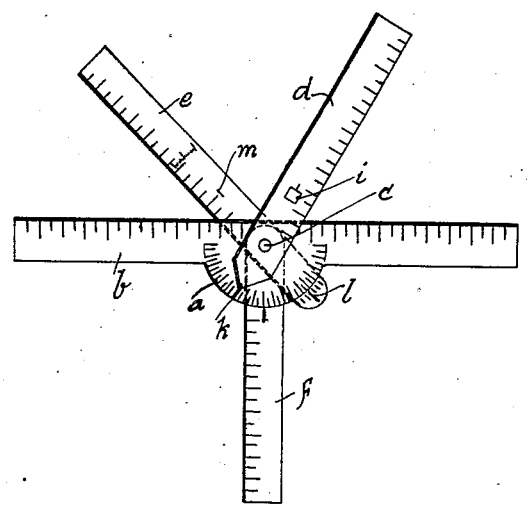
Fig. 1 shows the instrument with the protractor at the middle of the ruler.
Figure 2:
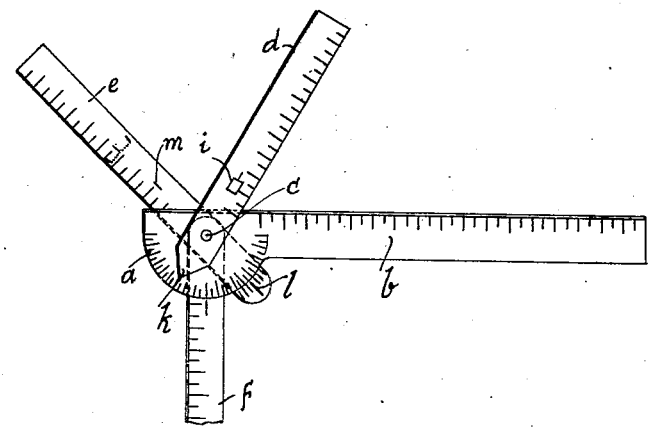
Fig. 2 is a similar view showing the protractor at the left end of the ruler.

As shown in the form of construction Fig. 2 the protractor $a$ sits on the left end of the measure $b$, the instrument being otherwise of a similar construction to that shown in Fig. 1. The instrument shown in Fig. 2 is specially adapted for workshops.

The manner in which the instrument is used need not be explained.

I claim:—

An instrument for determining and reading perspective angles up to 360° and for facilitating the perspective drawing, comprising in combination a thin horizontal rule, a protractor at the middle of the lower edge of said rule, a pivot pin at the center of said protractor, a thin rule for determining the perpendicular line pivotally mounted on said pivot pin under said protractor and having a mark on its upper surface registering with the graduation on said protractor, a thin rule pivotally mounted on said pivot pin on said protractor having a viewing aperture and a pointed extension moving over said protractor, and a second thin rule pivotally mounted on said pivot pin under said protractor having an extension projecting over the circumference of said protractor and a mark registering with the graduation on said protractor said two rules with extensions designed for determining protractor angles.

In testimony whereof I affix my signature.

H. HEHMSOTH.